United States Patent [19]

Foster et al.

[11] 4,348,868

[45] Sep. 14, 1982

[54] AUTOMATIC DILUTION CONTROL FOR ABSORPTION REFRIGERATION

[75] Inventors: Glenn B. Foster, Baldwinsville, N.Y.; John E. Post, Cincinnati, Ohio

[73] Assignee: Carrier Corporation, Syracuse, N.Y.

[21] Appl. No.: 200,860

[22] Filed: Oct. 27, 1980

[51] Int. Cl.³ .............................................. F25B 15/00
[52] U.S. Cl. ........................................ 62/101; 62/141
[58] Field of Search ................. 62/101, 141, 149, 476, 62/148

[56] References Cited

U.S. PATENT DOCUMENTS

| | | | |
|---|---|---|---|
| 3,426,547 | 2/1969 | Foster | 62/141 X |
| 3,452,552 | 7/1969 | Johnson | 62/141 |
| 3,550,391 | 12/1970 | Greacer | 62/141 X |
| 3,651,654 | 3/1972 | Rachfal | 62/141 X |
| 3,895,499 | 7/1975 | Hopkins | 62/141 X |
| 4,102,388 | 7/1978 | Blytas | 62/101 X |
| 4,143,521 | 3/1979 | Pano et al. | 62/101 |

Primary Examiner—Lloyd L. King
Attorney, Agent, or Firm—J. Raymond Curtin; David J. Zobkiw

[57] ABSTRACT

An absorption refrigeration system is used as the cooling load for a process such as a stripping operation by operating the system in response to the heat supplied. Because heat supply is determinative, the system is falsely loaded by bypassing refrigerant back to the solution.

4 Claims, 2 Drawing Figures

AUTOMATIC DILUTION CONTROL FOR ABSORPTION REFRIGERATION

BACKGROUND OF THE INVENTION

This invention relates to the use of the generator of an absorption refrigeration system, as a cooling load, to condense the products in a stripping operation and wherein the system is responsive to the heat supplied to the generator.

In absorption refrigeration systems, it is conventional to supply heat, usually in the form of steam, to the generator in order to boil off water and thereby increase the concentration of the absorbent, typically a lithium bromide solution. Usually, the steam supply is controlled in response to the cooling demand since energy conservation dictates against supplying unnecessary steam and because lithium bromide will crystallize if it becomes too concentrated.

SUMMARY OF THE INVENTION

Where heat, as in the form of a byproduct of a process, is available in sufficient amounts and at sufficient temperatures, this heat may be used in the generator in lieu of the conventional steam. In such a case, the process and its heat byproduct will often tend to be at a constant value and the generator will use the heat supplied while the absorption refrigeration system is accommodating a fluctuating cooling load. If the byproduct is heat alone, excess heat can be disposed of as required, however, where the heat byproduct is in the form of a product at an elevated temperature, the heat may need to be removed for product recovery. More specifically, in stripping operations in the petrochemical industry, for example, heated gases are produced which contain petroleum products and these gases must be cooled in order to condense out the petroleum products which are produced in a constant amount and at constant conditions. Thus, if these vaporized petroleum products are supplied to the generator of an absorption refrigeration system in place of the conventional steam, the energy demand for refrigeration is reduced, since steam is no longer required, and the gases are cooled by giving up heat in the generator to thereby condense out the petroleum products. Since heat supply rather than refrigeration demand is determinative under these circumstances, refrigeration demand will ordinarily be less than supply and the excess capacity can be used to further cool the process gases, as required.

It is an object of this invention to provide a system whereby the generator of an absorption refrigeration system can be used to condense heated process gases which are supplied in place of steam and thus the generator load remains constant regardless of the cooling load required in the evaporator section.

It is an additional object of this invention to provide an absorption system wherein the generator is supplied with all of the available heat independent of evaporator cooling capacity.

It is a further object of this invention to provide structure for artificially loading an absorption refrigeration unit by controlling the refrigerant capacity control valve.

It is an additional object of this invention to operate an absorption refrigeration unit with a constant heat input to the generator.

It is a yet still further object of this invention to provide an absorption refrigeration system which is selectively responsive to either the cooling demand or the heat supply. These objects, and others as will become apparent hereinafter, are accomplished by the present invention.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
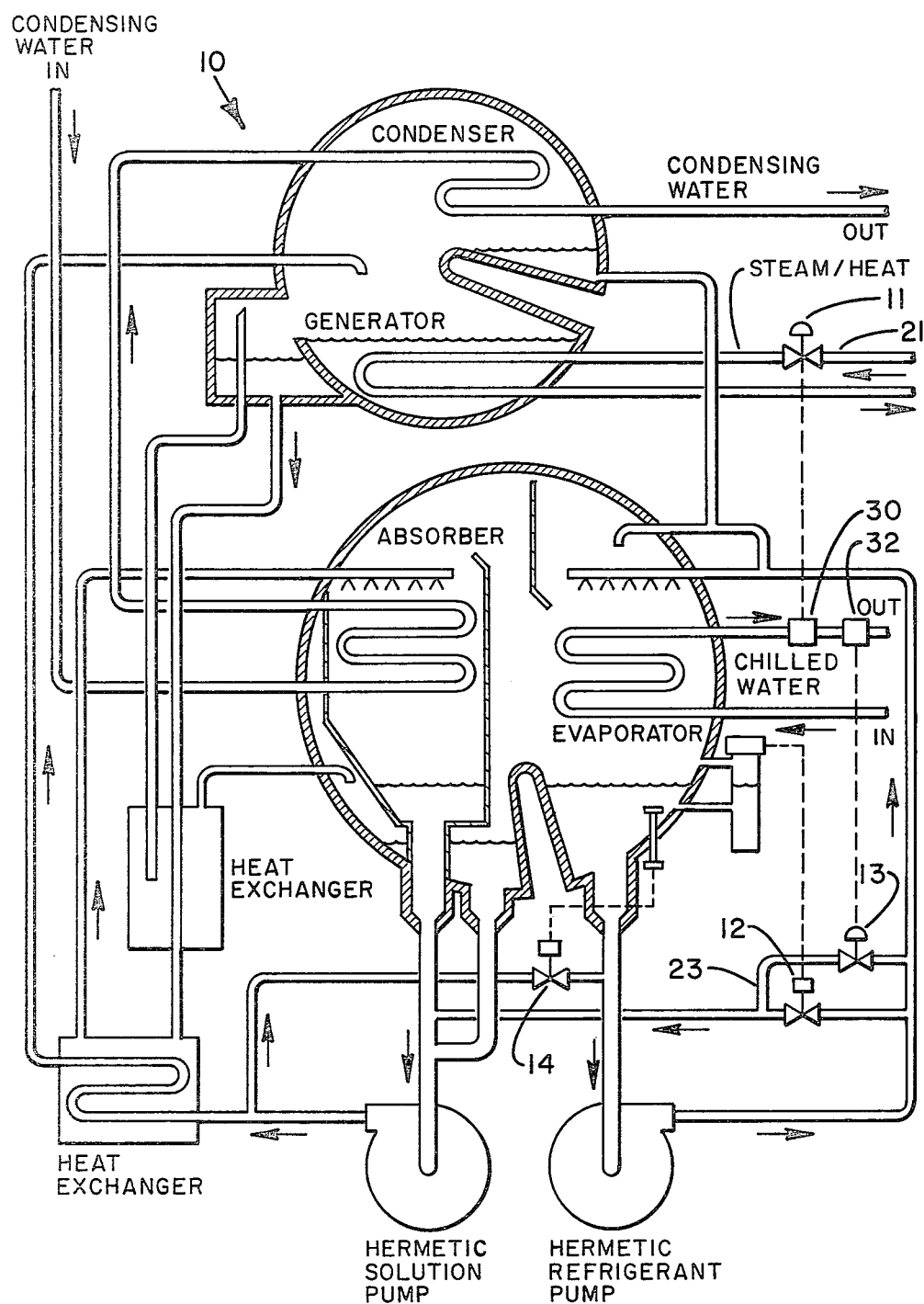
FIG. 1 is a diagrammatic view of an absorption refrigeration system embodying the present invention.

In FIG. 1, the numeral 10 generally indicates an absorption refrigeration system. The dotted lines leading to valves 11, 12, 13, and 14 represent the control conditions to which these valves are normally responsive. Specifically, normally closed valve 11 is located in the steam/heat supply line 21 and is normally responsive to the temperature of the chilled water leaving the evaporator which is sensed by sensor 30. Normally closed valve 12 prevents overconcentration and crystallization problems by automatically adding refrigerant (water) to the absorber via the hermetic solution pump and the generator if the refrigerant level in the evaporator rises to a pre-set limit. Normally closed valve 13 is located in the bypass line 23 and is responsive to the temperature of the chilled water leaving the evaporator which is sensed by sensor 32. Normally closed valve 14 ensures a safe pump suction level by adding solution, as needed, to maintain proper system balance in response to sensing the refrigerant level in the evaporator.

Valves 11, 12 and 14 and their above-described operation are known in the art and the operation of the system 10 with these valves operating as described is known. The present invention adds a bypass line 23 containing valve 13 for bypassing valve 12 to add refrigerant (water) to the solution. Additionally, means are provided for controlling valve 11 independently of the chilled water temperature which is sensed by sensor 30.

Figure 2:
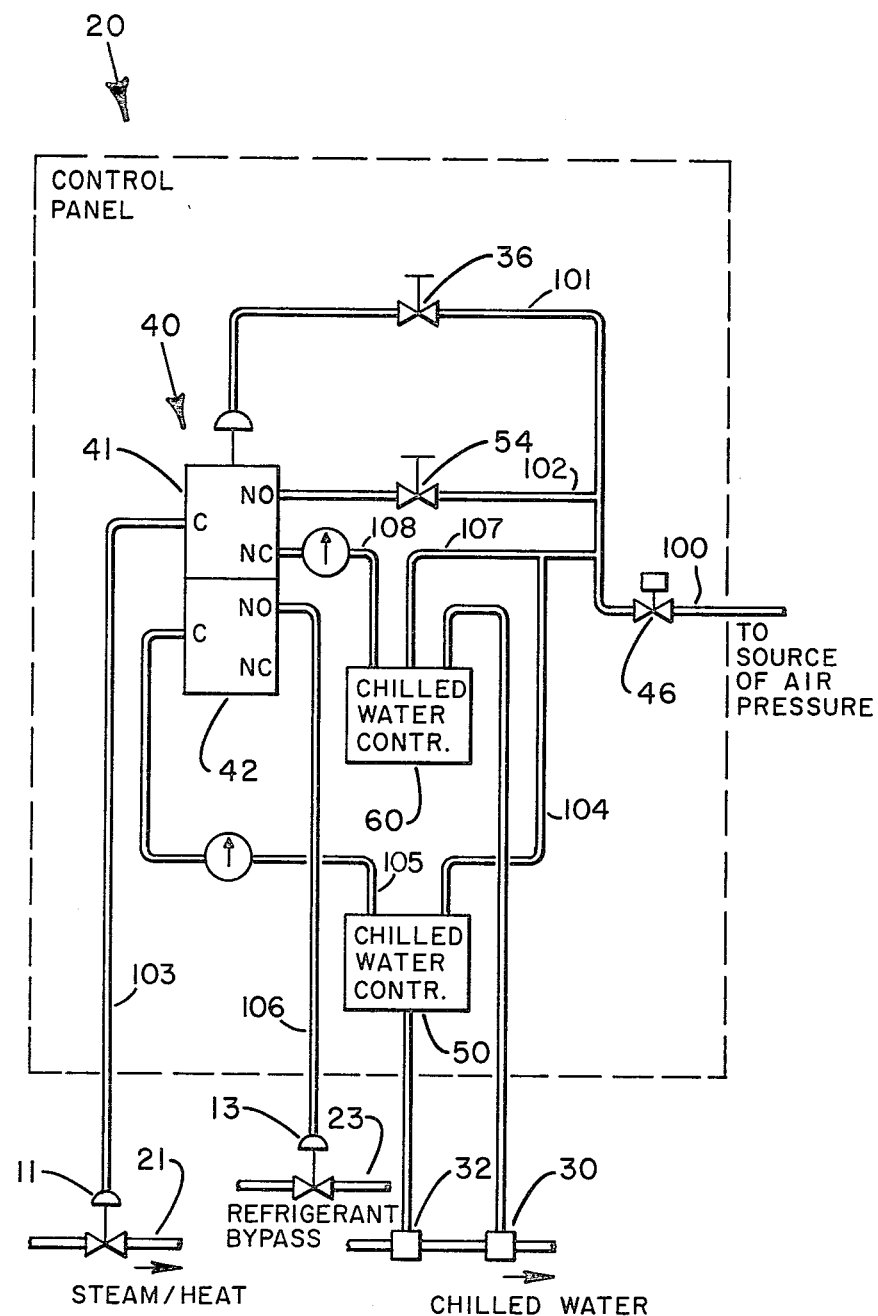
FIG. 2 is a schematic representation of the control system of the present invention for controlling the absorption refrigeration system of FIG. 1.

Referring now to FIG. 2, the numeral 20 generally designates the control panel for the system 10 of FIG. 1. Mode selector valve 36 controls the supplying of signal air via line 101 to the pilot valve 40 which is made up of valves 41 and 42. When mode selector valve 36 is closed to prevent the passage of signal air to pilot valve 40 via line 101, valves 41 and 42 go to the normally open (NO) position. In this case, control air passes from the source thereof (not illustrated) via line 100 operator actuated solenoid valve 46 and line 104 to chilled water controller 50 which regulates the control air supplied to valve 13 in response to the temperature of the leaving chilled water sensed by sensor 32. Sensor 32 and controller 50 are a reverse acting thermostat in that, as the sensed temperature drops, the pressure signal supplied by sensor 32 to controller 50 rises. This reverse action is necessary because in this mode the system is responsive to the heat input and the chilled water will tend to be overcooled. The regulated control air signal is then supplied by controller 50 via line 105 to common port (C) of valve 42, through valve 42, out normally open port (NO) of valve 42 and thence via line 106 to valve 13. Valve 13 is a normally closed pneumatic valve which controls the amount of refrigerant (water) injected into the solution, thereby controlling capacity by requiring the condensing out of more vapor in the generator so that a greater heat load requirement results. The regulated control air signal is additionally supplied via line 102 and gradual valve 54 to the normally open (NO) port of valve 41, through valve 41, out common port (C) of valve 41 thence via line 103 to valve 11 in the steam/heat supply line 21. In this mode, valve 11 is full open and the generator is allowed to run wild and consume the full load steam/heat flow. Valve 13 is controlled to falsely load the generator by requiring the condensing out of more vapor by injecting more refrigerant (water) into the solution. The gradual valve 54 can be used to manually position valve 11 by regulating the control signal if it is advisable to reduce/change the steam/heat consumption.

When selector valve 36 is opened to permit the supplying of control air to pilot valve 40 via line 101, pilot valve 40 moves to the normally closed position. Control air is also supplied via line 100, solenoid valve 46 and line 107 to chilled water controller 60 and thence via line 108 to normally closed (NC) port of valve 41, through valve 41, out common port (C) of valve 41, through line 103 to valve 11 to control the steam/heat supplied to the generator. In this position of pilot valve 40, valve 42 is shut off and valve 13 is closed to prevent the bypassing of refrigerant except under the control of valve 12 in response to the refrigerant level in the evaporator. The system is then under normal control and chilled water controller 60 will control valve 11 in response to the temperature of the leaving chilled water sensed by sensor 30 so that steam/heat will only be supplied to the generator in the amount required to handle the current refrigeration load. Sensor 30 and controller 60 are a direct acting thermostat in that as the sensed temperature falls, the branch line pressure falls.

Although a preferred embodiment of the present invention has been illustrated and described, other changes will occur to those skilled in the art. For example, valve 13 and bypass line 23 can be eliminated if valve 12 is made additionally responsive to the leaving chilled water temperature. Also, bypass line can be connected downstream of the hermetic solution pump so that refrigerant will be supplied to the generator without passing the hermetic solution pump. Valves 36, 54 and 46 can be manually actuated or controlled automatically by system conditions. It is therefore intended that the scope of the present invention is to be limited only by the scope of the appended claims.

What is claimed is:

1. A method for operating an absorption refrigeration system wherein the generator provides the cooling load for a process while the system continues to supply chilled water including the steps of:
    supplying heated gases from a process to the generator of an absorption refrigeration system to drive off refrigerant from the absorbent-refrigerant solution and be cooled thereby; and
    adding refrigerant to the absorbent-refrigerant solution in response to the temperature of the chilled water whereby the system is responsive to the heat supplied to the generator rather than the cooling demand.

2. The method of claim 1 wherein said step of supplying heated gases from a process includes the supplying of the heated product vapors from a stripping operation to the generator.

3. A method for selectively operating an absorption refrigeration system in response to either the refrigeration demand or in response to the amount of heat supplied to the generator including the steps of:
    selectively placing the system in either a first mode in which the system is responsive to refrigeration demand or a second mode in which the system is responsive to the heat supplied;
    in the first mode, regulating the amount of heat supplied to the generator in response to the temperature of chilled water leaving the evaporator; and
    in the second mode, regulating the amount of refrigerant added to the absorbent-refrigerant solution in response to the temperature of the chilled water whereby the system is responsive to the heat supplied to the generator rather than the cooling demand and the generator can serve as the cooling load for a process.

4. Apparatus for selectively operating an absorption refrigeration system in response to either the cooling demand or the heat supply comprising:
    an absorption refrigeration system including an absorber, an evaporator, a generator, a condensor, refrigerant, absorbent-refrigerant solution, a first line for supplying heat to said generator and a second line for removing chilled water from the evaporator;
    means for sensing the temperature of the chilled water;
    means for controlling the supplying of refrigerant to the absorbent-refrigerant solution;
    means for controlling the supplying of heat to said generator;
    means for selectively causing either said means for controlling the supplying of heat to said generator to be responsive to the temperature of the chilled water whereby the system is responsive to cooling demand or for causing said means for controlling the supplying of refrigerant to the absorbent solution to be responsive to the temperature of the chilled water whereby the system is responsive to the heat supplied to the generator.

* * * * *